United States Patent [19]

McClean

[11] Patent Number: 5,138,938
[45] Date of Patent: Aug. 18, 1992

[54] SANDWICH TOASTER

[75] Inventor: John W. McClean, Roselands, Australia

[73] Assignee: Breville R & D Pty Limited, Pyrmont, Australia

[21] Appl. No.: 786,209

[22] Filed: Oct. 31, 1991

[30] Foreign Application Priority Data

Nov. 19, 1990 [AU] Australia .............. PK3429
May 24, 1991 [AU] Australia .............. PK6332

[51] Int. Cl.⁵ ............... A47J 37/00; A47J 37/06
[52] U.S. Cl. ............................... 99/331; 99/341; 99/378; 99/385; 219/386; 219/525; 219/553
[58] Field of Search ............... 99/331, 341, 372, 376, 99/389, 385, 378, 377, 379, 380–384, 426, 427, 440; 219/200, 553, 386, 524, 525

[56] References Cited

U.S. PATENT DOCUMENTS

| | | | |
|---|---|---|---|
| 1,718,260 | 6/1929 | Shaffer | 99/382 |
| 1,874,608 | 8/1932 | Parr | 99/383 |
| 1,874,836 | 8/1932 | Trenner et al. | 99/381 |
| 1,969,361 | 8/1934 | Fajen | 99/381 |
| 2,140,158 | 12/1938 | Knapp | 99/341 |
| 3,146,696 | 9/1964 | Connolly et al. | |
| 3,159,094 | 12/1964 | Crease et al. | 99/341 |
| 3,393,295 | 7/1968 | Jepson et al. | |
| 3,587,907 | 6/1971 | Okuda | 99/385 |
| 3,694,623 | 9/1972 | Toyooka et al. | 219/553 |
| 3,737,624 | 6/1973 | Eilenberger | 219/525 |
| 3,934,332 | 3/1976 | Marsh | 219/386 |
| 4,297,941 | 11/1981 | Gallina . | |
| 4,520,602 | 6/1985 | Miller | 219/200 |

FOREIGN PATENT DOCUMENTS

| | | | |
|---|---|---|---|
| 31696 | 8/1984 | Australia . | |
| 2335872 | 1/1974 | Fed. Rep. of Germany | 219/524 |
| 2915153 | 10/1980 | Fed. Rep. of Germany | 99/389 |
| 2438679 | 1/1976 | Fed. Rep. of Germany . | |
| 8615606 | 4/1987 | Fed. Rep. of Germany . | |

OTHER PUBLICATIONS

Word Patents Index Latest, Week 8517, Derwent Publications Ltd., London, AN 85-099022, Abstract, U-A-31 696-84, date unknown.

Primary Examiner—Timothy F. Simone
Attorney, Agent, or Firm—Nikaido, Marmelstein, Murray & Oram

[57] ABSTRACT

A sandwich toaster or griller in which the upper die mold half is constituted by a plurality of flat sheets of glass or other suitable material having between them an electric heater element consisting of a flat nichrome wire or a printed element parallel lengths which extend across the sheets of glass. The spacing of the lengths of heater element is such as to provide a more or less uniform toasting effect on the surface of the sandwich, the toasting of which is visible through the glass or other transparent sheets.

4 Claims, 4 Drawing Sheets

SANDWICH TOASTER

FIELD OF THE INVENTION

The present invention relates to a sandwich toaster.

BACKGROUND OF THE INVENTION

Sandwich toasters conventionally consist of a pair of die mold halves that when brought together define a cavity, each of the die mold halves having in it an electrical heater element, the arrangement being such that a food product to be toasted or grilled can be placed in a lower die mold half and an upper die mold half brought down on top of it, heat generate by the electric heater elements acting to toast or grill surfaces of the food product.

In the specification of Australian Patent Application 31696/84 filed on 7 Aug. 1984 there is disclosed a sandwich toaster or griller consisting of a pair of hingedly connected die mold halves that, when brought together define a cavity, each of the die mold halves having in it an electrical heater element, the arrangement being such that a sandwich or other food product to be toasted or grilled can be placed in a lower die mold half and the upper die mold half brought down on top of it, heat generated by the electric heater elements acting to toast or grill surfaces of the food product characterized in that the upper die mold half is made wholly or partially of transparent heat resisting material whereby a substantial part of an upper surface of the food product can be observed during toasting or grilling, the electric heating element in the upper die mold half being incorporated in the transparent material.

SUMMARY OF THE INVENTION

This specification describes a sandwich toaster in which the upper die mold half is made of transparent heat resisting glass, for example, boro-silicate glass. The construction described follows generally the traditional form of construction for a sandwich toaster.

Since the abovementioned patent application was lodged further investigations have shown that the construction described is inoperable due mainly to the use of an upper mold die half made of glass simulating a traditional upper die mold half. This necessitated the use of pieces of glass of irregular shape and not inconsiderable thickness. While the specification recognizes the necessity for keeping the lower glass element of a uniform wall thickness experience has shown that this cannot be satisfactorily achieved with the form of construction described.

The main result however of subsequent investigations that have been carried out has led to the discovery that the basic objective of the invention, namely to enable the toasting of the sandwich to be observed visually can be achieved in an effective and economic manner only by replacing the upper mold half of the traditional sandwich toaster with sheets of flat glass or other suitable transparent material having clamped tightly between them an electric heater element consisting of a flat nichrome wire, or a printed element, parallel lengths of which extend across the sheets of glass, the spacing of the lengths of heater element being such as to provide a more or less uniform toasting effect on the surface of a sandwich, the ends of the lengths of the element being interconnected to provide a continuous heating element.

Apart from functional defects and production tolerances in maintaining a constant shape, thus not allowing the element to be tightly clamped in the previously proposed construction the cost of producing dies to make appropriately shaped glass elements has been found to be prohibitive whereas the use of flat sheets of glass makes the use of dies unnecessary.

The present invention consists in a sandwich toaster or griller consisting of a pair of hingedly connected die mold halves that, when brought together define a cavity, each of the die mold halves having an electrical heater element, the arrangement being such that a sandwich or other food product to be toasted or grilled can be placed in a lower die mold half and the upper die mold half brought down on top of it, heat generated by the electric heater elements acting to toast or grill surfaces of the food product characterized in that the upper die mold half incorporates sheets of flat glass or other suitable transparent material having between them an electric heater element consisting of a flat nichrome wire or a printed element, parallel lengths of which extend across the sheets of glass, thesspacing of the lengths of heater element being such as to provide a more or less uniform toasting effect on the surface of a sandwich, the ends of the lengths of the element being interconnected to provide a continuous heating element.

DESCRIPTION OF THE DRAWING

In order that the nature of the invention may be better understood a preferred form thereof is hereinafter described by way of example with reference to the accompanying drawings in which.

DESCRIPTION OF THE PREFERRED EMBODIMENTS

Figure 1:
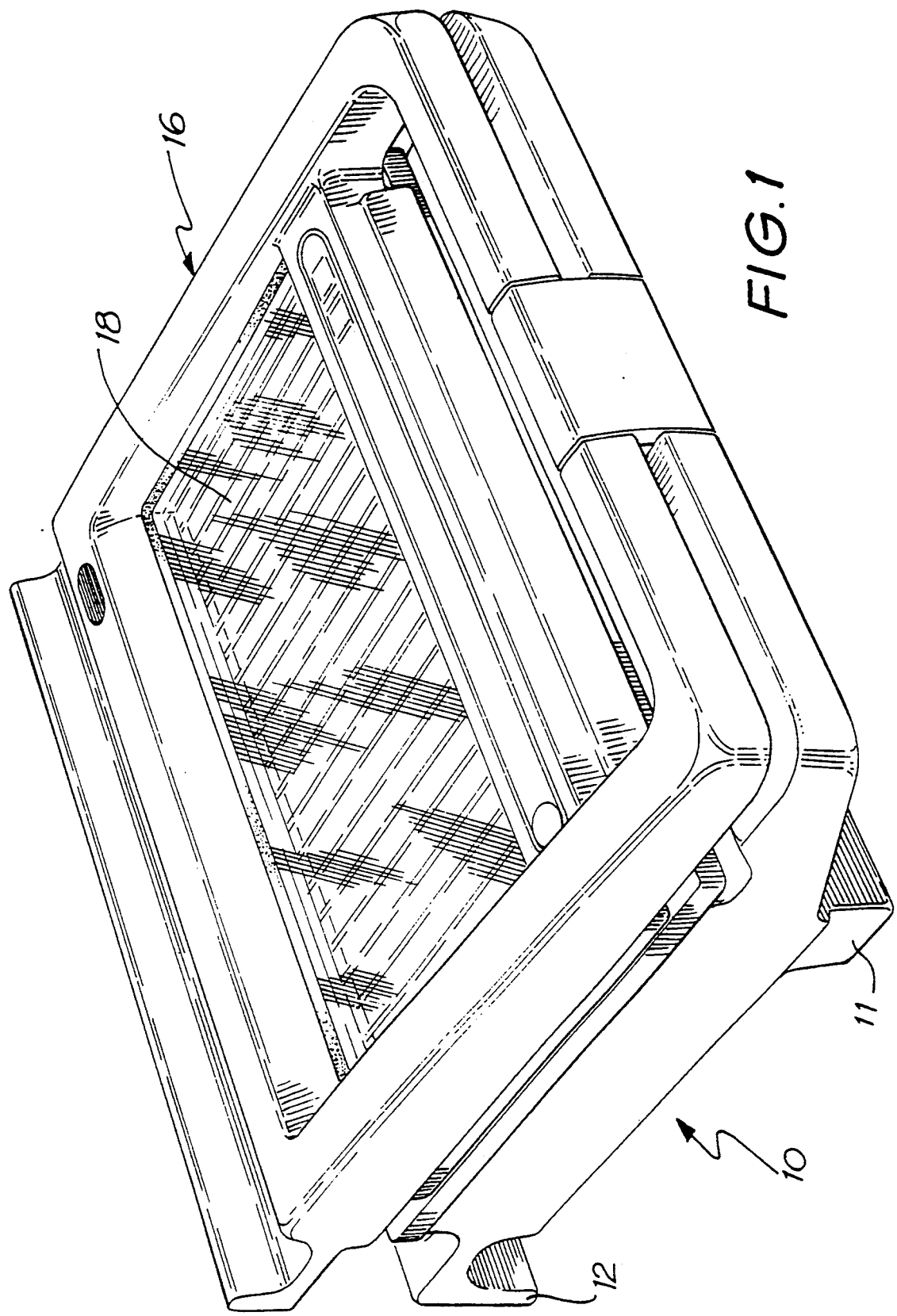
FIG. 1 is a perspective view of a sandwich toaster according to the invention.
Figure 2:
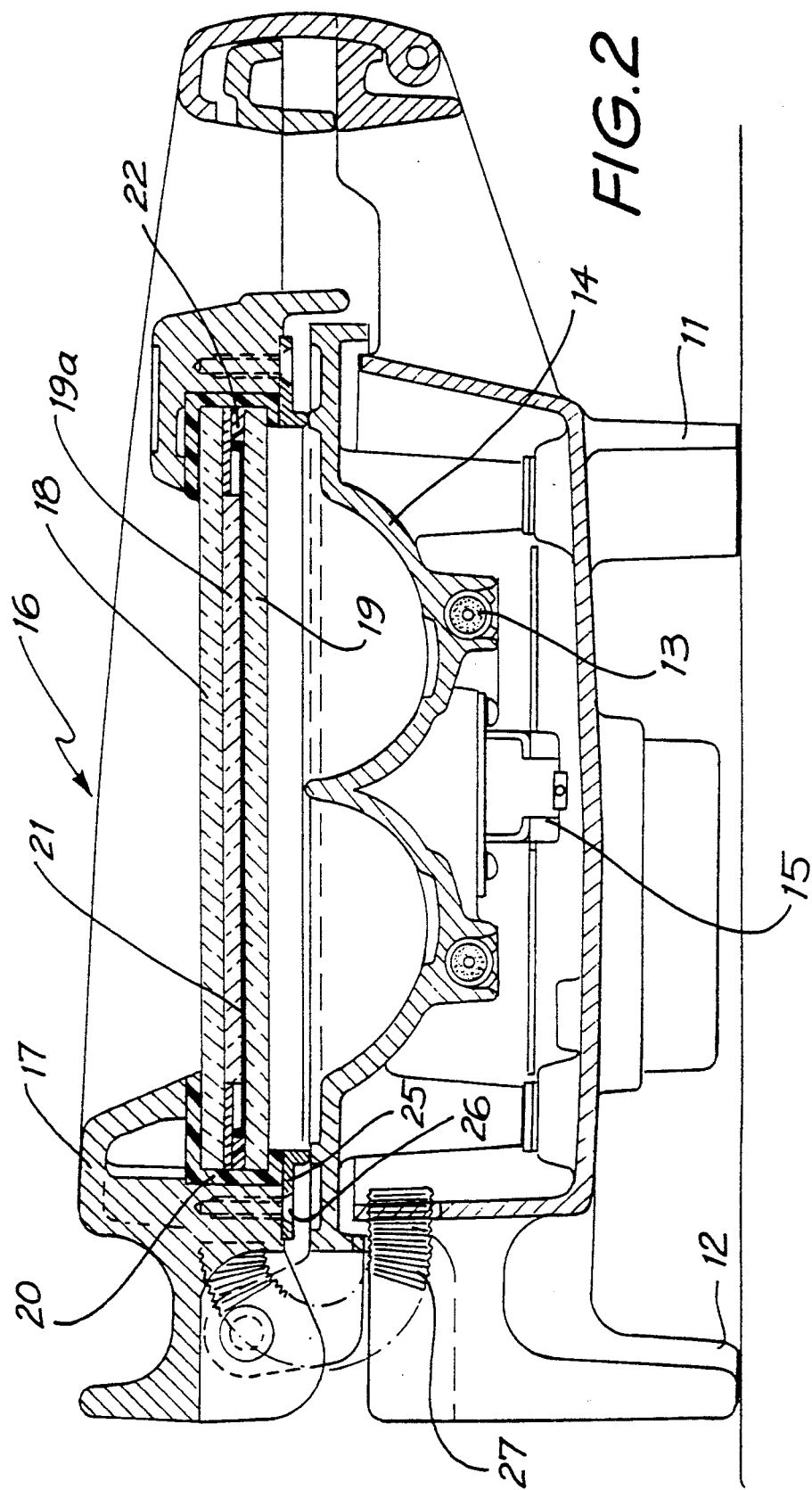
FIG. 2 is a median cross-sectional view of the sandwich toaster of FIG. 1.

As will be seen from FIGS. 1 and 2 the general construction of the sandwich toaster according to the invention is similar to that of a conventional sandwich toaster consisting of a housing 10 made in a conventional manner and supported on legs 11 and 12 and having within it a conventional heating element 13 embedded within an aluminium pressure cast die mold half 14 coated internally with PTFE. The heater element is controlled by a thermostat 15 and the whole is enclosed in a casing formed unitarily with the legs 11 and 12 preferably of phenolic material. The lower mold half is made somewhat deeper than is normally the case to take account of the fact that there is no cavity in the upper part of the toaster.

The conventional upper die mold half is replaced by an upper half 16 consisting of a surround of phenolic material 17 which is constructed to hold in place sheets 18, 19 and 19a of a transparent material such as boro-silicate glass or ceramic glass. These sheets are quite flat and the under surface of the lowest sheet 19 is pressed closely against the upper surface of a sandwich to be toasted. The result of this is that a sandwich is produced which is flat on one side and of a scalloped shape conforming to the lower mold half 14 on the other so that the toasted sandwich produced in the toaster can be laid flat on a plate.

The sheets 18, 19 and 19a are held in place by a surrounding silicone rubber gasket 20 of food grade high temperature silicone rubber which seals the edges of the sheets and prevents the ingress of moisture between them. During construction the upper half is assembled upside down so that the sheet 18 is placed first into the gasket 20 with the sheet 19a, the nichrome heating element 21 and the plate 19 assembled in the manner illustrated in FIG. 3.

The heater element 21 consists of lengths of nichrome wire extending in parallel lines across the glass, individual runs of heater element being spaced apart by a distance of about 10 mm. While the spacing need not be exactly 10 mm it is important that it should not be so great as to produce uneven toasting of the surface of a sandwich. Too close spacing on the other hand can lead to overheating.

Figure 3:
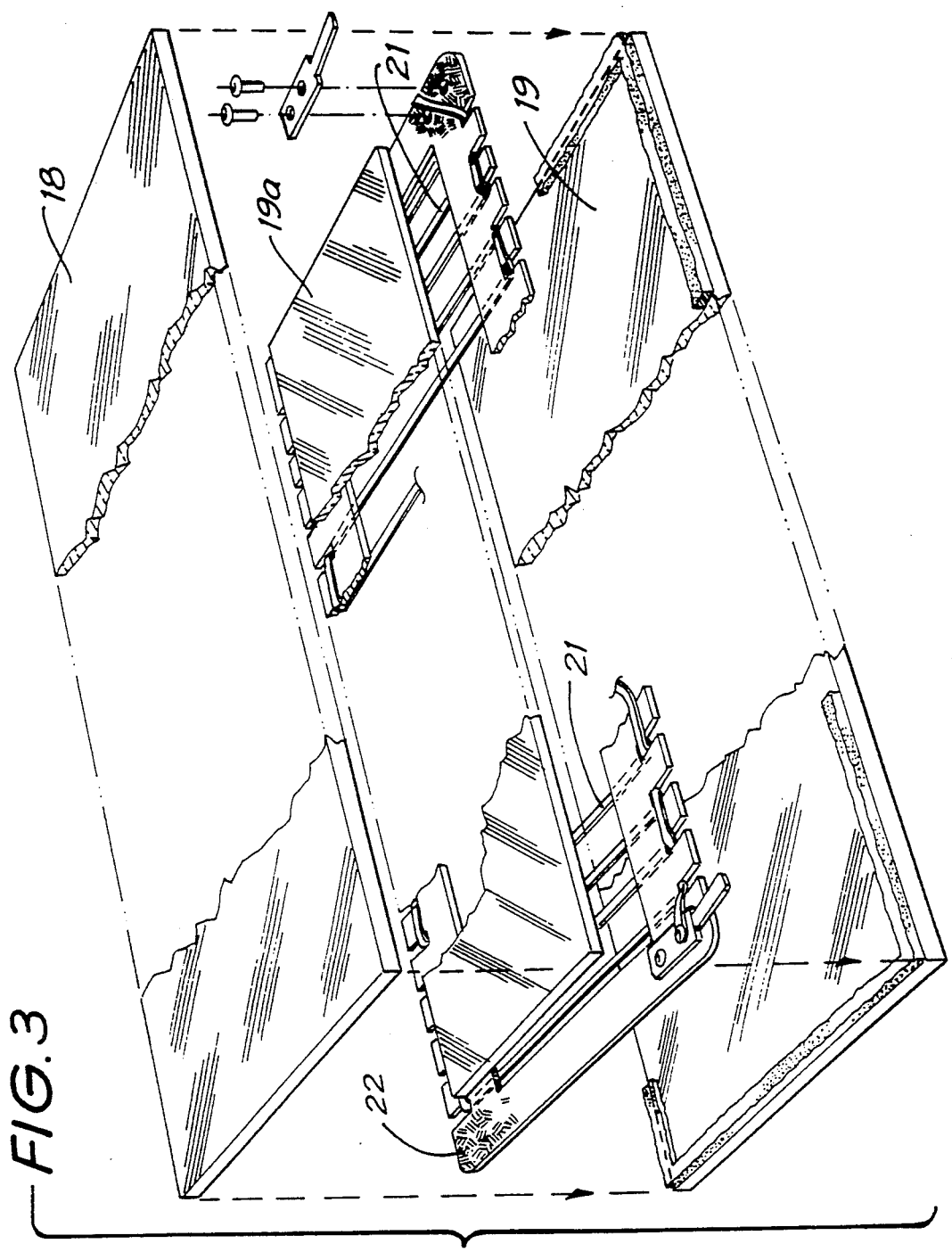
FIG. 3 is an exploded view of the arrangement of glass sheets supporting the heating element.

The runs of nichrome wire form a continuous element, the ends being returned over projections formed on a surrounding micanite former 22 as illustrated in FIG. 3. These are overlaid by the glass sheet 19a. This arrangement ensures that the runs of heater element are held accurately in place during use. The sheets of glass are preferably of the order of 3 mm thick and the flat nichrome wire is arranged to lie closely against the lower surface of the glass sheet 19a.

The glass 19 is then placed in position. The whole assembly is then held firmly in place by means of the steel clamping plate 25 which is held in position by screws 26.

Power to the nichrome heater element is supplied through the flexible cable 27 from the lower mold half.

Figure 4:
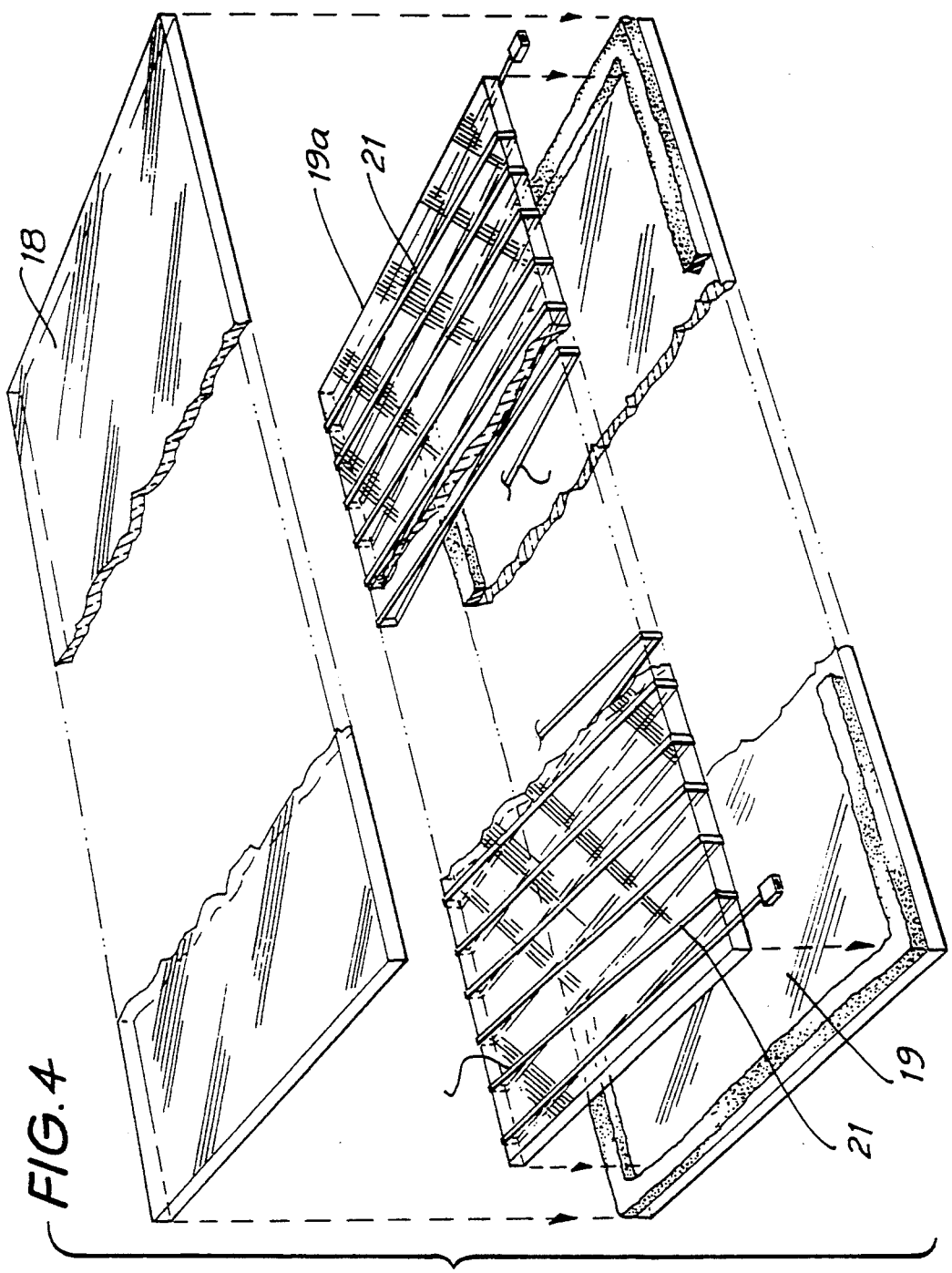
FIG. 4 is an exploded view of an alternative arrangement to that shown in FIG. 3 in which the heater element is wound around a sheet of glass.

The heater element instead of being constructed and arranged as illustrated in FIG. 3 may alternatively be wound around the sheet of glass 19a as illustrated in FIG. 4.

In a further alternative form of construction the heater element instead of being in the form of a nichrome wire may be printed onto one of the glass sheets in a manner well known in the art. At the present time however the cost of printing a heating element capable of handling the power required makes this form of construction more costly than either of those described above.

In practice the sandwich toaster is used as a conventional sandwich toaster with the difference that the progress of toasting of the sandwich is observable through the glass sheets.

The surround of the upper half includes an additional foot 28 that enables the toaster to be stood on a level surface vertically so that the degree of toasting can be observed from a distance while the user is occupied with some other task in a kitchen.

The embodiment of the invention described above is given by way of example only as illustrative of one manner in which the invention may be applied. Details of construction may be varied within the general scope of the invention.

I claim:

1. A sandwich toaster or griller comprising: a pair of hingedly connected die mold halves that, when brought together define a cavity, each of the die mold halves having an electrical heater element, an arrangement being such that a sandwich or other food product to be toasted or grilled can be placed in a lower die mold half and an upper die mold half brought down on top of said lower die mold, heat generated by each electric heater element acting to toast or grill surfaces of the food product, said upper die mold half incorporating sheets of flat glass or other suitable transparent material having between said sheets one electric heater element of a flat nichrome wire or a printed element, parallel lengths of which extend across the sheets of glass, spacing of the lengths of the electric heater element being such as to provide a more or less uniform toasting effect on the surface of the sandwich or other food product, ends of the lengths of the electric heater element being interconnected to provide a continuous heating element.

2. A sandwich toaster or griller as claimed in claim 1 wherein the upper mold half incorporates three sheets of flat glass or other suitable transparent material, the heater element being in a form of a flat nichrome wire supported on a surrounding micanite former and being clamped between two of said sheets of glass.

3. A sandwich toaster or griller as claimed in claim 1 wherein the upper mold half includes three sheets of flat glass or other suitable transparent material, the heating element of the upper die mold half consisting of a flat nichrome wire wound around a middle one of said three sheets of glass.

4. A sandwich toaster or griller as claimed in claim 1 wherein the sheets of glass are held within a surrounding silicone rubber gasket of food grade high temperature silicone rubber which also serves to seal the edges of the sheets of glass to prevent the entry of moisture between them.

* * * * *